US008752665B1

(12) United States Patent
Tomoiu

(10) Patent No.: US 8,752,665 B1
(45) Date of Patent: Jun. 17, 2014

(54) THERMO-ACOUSTIC REACTOR WITH MOLECULAR DISASSOCIATION

(71) Applicant: Constantin Tomoiu, Bridgeport, CT (US)

(72) Inventor: Constantin Tomoiu, Bridgeport, CT (US)

( * ) Notice: Subject to any disclaimer, the term of this patent is extended or adjusted under 35 U.S.C. 154(b) by 0 days.

(21) Appl. No.: 13/955,093

(22) Filed: Jul. 31, 2013

Related U.S. Application Data

(60) Provisional application No. 61/816,718, filed on Apr. 27, 2013.

(51) Int. Cl.
*G01V 1/06* (2006.01)

(52) U.S. Cl.
USPC ............ 181/142; 181/116; 181/117; 181/118

(58) Field of Classification Search
CPC .................................. G01S 1/72; G01V 1/112
USPC .................................. 181/142, 116, 117, 118
See application file for complete search history.

(56) References Cited

U.S. PATENT DOCUMENTS

| | | | | | |
|---|---|---|---|---|---|
| 3,997,021 | A * | 12/1976 | Chelminski | .................. | 181/106 |
| 4,100,991 | A * | 7/1978 | Airhart | .................. | 181/117 |
| 4,408,676 | A * | 10/1983 | McCoy | .................. | 181/113 |
| 5,229,977 | A * | 7/1993 | Owen | .................. | 367/145 |
| 5,233,570 | A * | 8/1993 | Donskoy | .................. | 367/142 |
| 5,237,964 | A | 8/1993 | Tomoiu | .................. | 123/25 C |
| 6,776,256 | B2 * | 8/2004 | Kostyuchenko et al. | ..... | 181/116 |
| 6,804,963 | B1 | 10/2004 | Tomoiu | .................. | 60/670 |
| 8,302,730 | B2 * | 11/2012 | Fullerton | .................. | 181/101 |

* cited by examiner

*Primary Examiner* — Forrest M Phillips
(74) *Attorney, Agent, or Firm* — Fattibene and Fattibene; Paul A. Fattibene

(57) ABSTRACT

An air, fuel, and water mixture is injected into a resonance chamber forming micro-packets. The micro-packets are ignited forming micro-explosions in a combustion chamber containing a central resonance chamber creating a standing wave interfering with a standing wave in the resonance chamber generating the micro-packets. The interfering waves are in phase aiding in the disassociation of molecules, including hydrogen and oxygen, in the air, fuel and water mixture. Efficient combustion is achieved with a nearly zero carbon emissions. The heat generated from the combustion may be used to produce work by any conventional device, such as a steam engine or turbine or generate heat for a building.

9 Claims, 2 Drawing Sheets

THERMO-ACOUSTIC REACTOR WITH MOLECULAR DISASSOCIATION

RELATED APPLICATION

This application claims the benefit of U.S. Provisional Application No. 61/816,718 filed Apr. 27, 2013.

FIELD OF THE INVENTION

The present invention relates in general to generating heat using hydrocarbons and water in a thermo-acoustic reactor and in particular to a method and device which efficiently dissociates hydrocarbons and water in their elements and exothermically reforms them into cleaner gases. The process has substantially zero carbon emissions with no carbon oxides produced.

BACKGROUND OF THE INVENTION

Internal combustion engines are used in many applications to produce work and drive machinery. Many of these combustion engines produce dangerous gases, including carbon emissions. There have been many efforts to provide more efficient combustion of hydrocarbon fuels. One such effort is disclosed in U.S. Pat. No. 6,804,963 entitled "Thermoreactor with Linear to Rotation Motion Conversion" issuing to Constantin Tomoiu on Oct. 19, 2004, herein incorporated by reference. Therein disclosed are gas fuels injected into a resonance chamber, which generates ultrasound that works with a combustion chamber where the gas fuels are efficiently burned. While this thermoreactor provides efficient combustion of the gas fuels, there is a need for providing even more efficient combustion without any or reduced carbon emissions.

SUMMARY OF THE INVENTION

The present invention utilizes combustion or reaction of hydrocarbons in an acoustic field as a source of acoustic and heat energy to resonate and dissociate water molecules and combustion or reaction product molecules forming them into initial water molecules and other nonpolluting byproducts with a gain of heat energy.

In a first stage micro-explosions are generated. Gaseous fuels, air, and water forming a gaseous mixture flow under pressure through a nozzle forming micro-packets. In a stationary wave generator, the pressure of the gaseous mixture decreases and velocity increase to a supersonic value. Then the gaseous mixture flows into a heated, by combustion, resonance chamber where the thermal energy and pressure of the gaseous mixture is increased. When the pressure in the resonance chamber is greater than the incoming pressure of the gaseous mixture through the nozzle, the gaseous mixture overflows from the resonance chamber and collides with the incoming gaseous mixture through the nozzle to form micro-packets. The gaseous mixture forming micro-packets will ignite initially by a sparkplug, generating micro-explosions at about the same frequency with the rate or number per second of micro-packets expelled from the resonance chamber. The micro-explosions transfer thermal and acoustic energy to the mass of water contained in the micro-packets, partially dissociating the water. The dissociated components of the water will exothermically react generating a secondary explosion resulting in amplifying the thermo-acoustic energy of exploding micro-packet. The micro-explosions also transfer heat and acoustic energy to the housing of the micro-packets and stationary wave generator and therefor to the nozzle and resonance chamber and to the mass of the gaseous mixture of air-fuel-water in the nozzle and resonance chamber. As a result waves from the nozzle interfere with waves from the stationary wave generator or resonance chamber and stationary waves are generated on the resonance chamber at each period of time between overflows. These stationary waves in the resonance chamber induce a vibration on the expelling micro-packets.

In stage two, the dissociation-formation process, the combusted or reacted products including water steam from micro-explosion flow into a larger central resonance chamber, placed in the combustion chamber, were also stationary waves are generated. When the waves generated by micro-explosions interfere with the main resonance chamber the waves are divided into two components. The main component propagates through the mass into the central resonance chamber where incident waves generated by the micro-explosions will interfere with waves reflected by the flat bottom of the resonance chamber to generate stationary waves. The difference in phase between waves generated by micro-explosions and stationary waves are near zero or zero, in phase, and by interference produce an amplitude equal with the sum of the individual amplitudes of the two waves, reflected and incident wave, which interfere. Inside the central resonance chamber molecules will reach extremely high temperatures due to being exposed to a compression and relaxation within their resonance frequencies. As a result, the molecules of combustion or reaction gases and water created by the exploding micro-packets and injected water are dissociated into their components, including hydrogen. The formation of water from the atoms of hydrogen and oxygen of dissociated water molecules releases 241.8 KJ of heat when one mole of water vapor is produced.

Experiments with the current prototype shows the dissociation process takes place at about 1,100° C. and requires only 123 KJ/mole of thermal energy. The acoustic resonance provides the rest of the dissociation energy. As a result 118.8 KJ/mole in the form of thermal energy is gained. This 118.8 KJ are added to 123 KJ/mole provided by liquid propane gas and stored as thermal energy in the mass of a mole of water. This results in 241.8 KJ/mole of water. Carbon oxides resulting from the combustion or reaction of micro-packets is also dissociated. Test on the exhaust gas of the current prototype shows only an average of 138 ppm (parts per million) of carbon monoxide and 607 ppm of carbon dioxide. The condensed water vapor from the exhaust gas show only 0.01% of absorbed carbon dioxide. About 0.001% solid carbon was found per volume of condensed water vapor. No other solid particles were found in the exhaust gas. The disassociated combustion products are reformed into different molecules.

When pressure is increased in the central resonance chamber as a result of thermal expansion, gases overflow transporting thermal and acoustic energy to the masses in the combustion chamber. At this moment, phase, a gradient temperature is created along the central resonance chamber and as a result thermal oscillations with a high acoustic level are generated. Thermal oscillations will vibrate the molecules in the central resonance and combustion chamber.

The second incident wave component generated by the micro-explosions is the collision of front acoustic waves with the circular inner surface of the central resonance chamber. The metal mass of the central resonance chamber will transport acoustic waves with high velocity, about 5000 m/s, through the walls in the form of longitudinal and transverse waves. The waves will induce vibration in the hydrocarbons and water molecules adjacent to the chamber walls, and the residual waves will be exhausted through the second part, stage, of the central resonance chamber which acts as an acoustic exhaust. Also the metal wall of the central resonance chamber will filter out through the acoustic exhauster all frequencies other than natural frequencies of vibration of the mass inside the resonance chamber. The expelled byproduct gases flow between the central resonance chamber and combustion chamber to be exhausted. A portion of the gases flow to the bottom of the combustion chamber where they are compressed and then expended to cool the zone or area and then are exhausted through the exhaust port. The flat bottom of the combustion chamber acts also as a resonator for the small volume of combustion gases escaping through the space between the combustion chamber and the central resonance chamber during the explosion of micro-packets.

It is an object of the present invention to produce thermal energy efficiently and with substantially no carbon emissions.

It is an advantage of the present invention that a resonance is used to assist in the disassociation of molecules.

It is a feature of the present invention that a resonance chamber is used to form micro-packets of fuel and a standing wave and a central resonance chamber is placed in a combustion chamber.

These and other objects, advantages, and features will become readily apparent in view of the following more detailed description.

DETAILED DESCRIPTION OF THE PREFERRED EMBODIMENT

Figure 1:
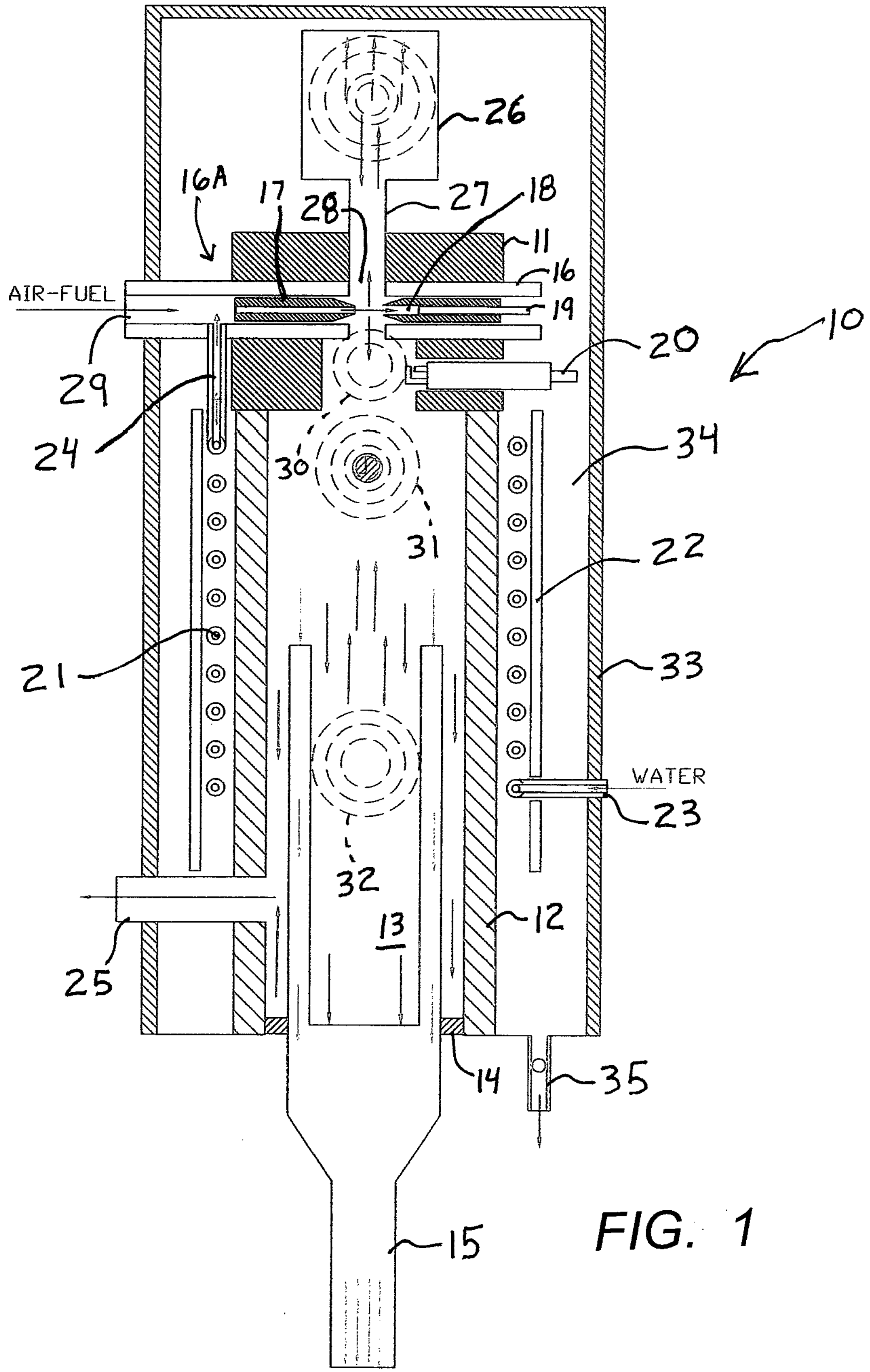
FIG. 1 schematically illustrates the present invention.

FIG. 1 schematically illustrates the thermo-acoustic reactor with molecular disassociation 10 comprising head 11 and combustion chamber 12 according to the present invention. Placed within combustion chamber 12 is a central resonance chamber 13. The central resonance chamber 13 is welded at nodal point 14 to the bottom of combustion chamber 12. The nodal point is the point in a standing wave where the wave has substantially zero amplitude. The resonance chamber 13 has a smaller diameter or lateral dimension extension 15 which acts as an acoustic exhaust for the waves with frequencies other than the resonance frequencies filtered by the central resonance chamber 13. Within head 11 is placed a micro-packet and stationary wave generator housing 16. Within housing 16 are placed nozzle 17 and resonance chamber 18. Resonance chamber 18 slides on housing 16 and the distance between nozzle 17 and resonance chamber 18 can be adjusted. Piston 19 slides to adjust the depth of resonance chamber 18 and therefor the size and rate or number per second of micro-packets generated. On head 11 is mounted sparkplug 20. Around the combustion chamber 12 are placed water coil 21 and infrared receiver 22. Water coil 21 has water inlet port 23 and water outlet port 24. Combustion chamber 12 has an exhaust port 25. The exhaust port 25 may be couple to a condenser and filter. The condenser condenses water vapor in the exhaust and recirculates the condensed water. A filter can remove any particulate matter from the water condensate. Acoustic damper chamber 26 is connected by the head 11 with the tube 27 and communicates with the combustion chamber 12 through port 28. Housing 16 has an air-fuel inlet 29.

Figure 2:
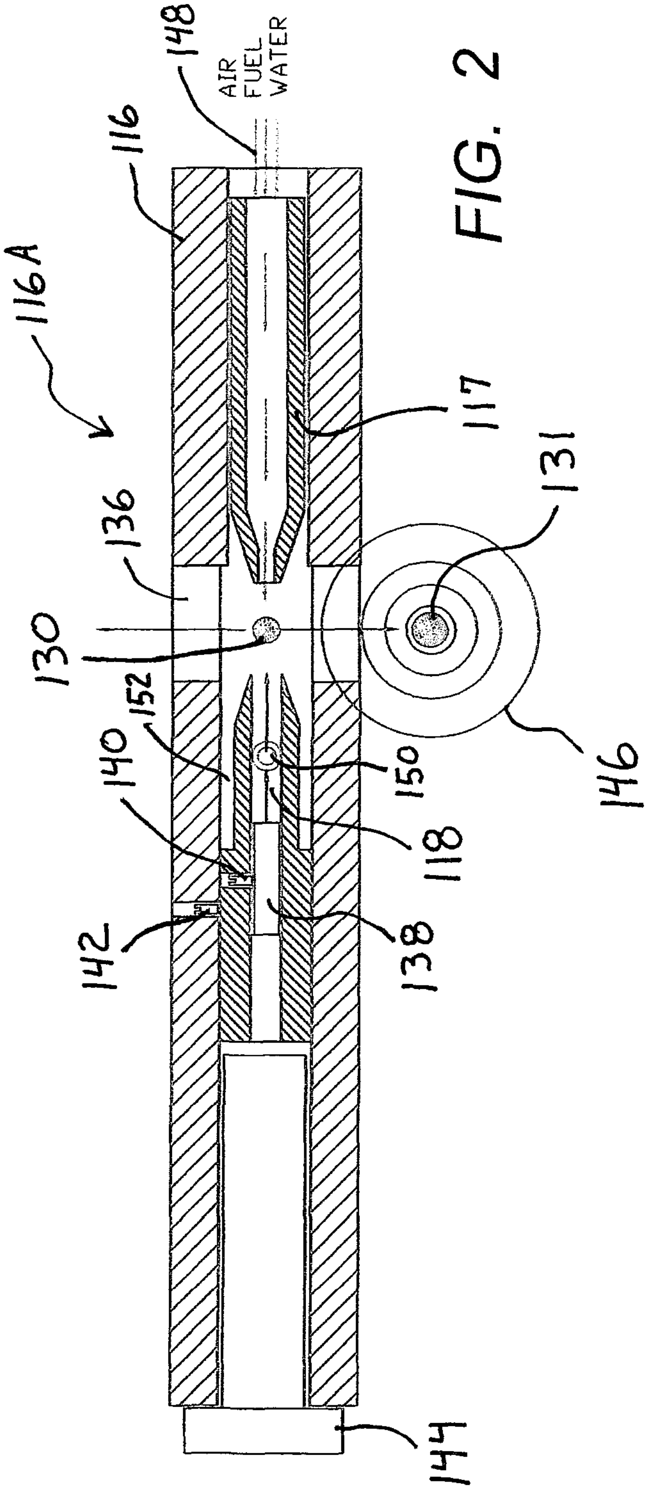
FIG. 2 schematically illustrate the micro-packets and stationary wave generator

FIG. 2 schematically illustrates another embodiment of a micro-packets and stationary wave generator 116A similar to the micro packet and stationary wave generator illustrated in FIG. 1. The micro-packets and stationary wave generator 116A comprises, housing 116, nozzle 117 and resonance chamber 118. Housing 116 communicates with acoustic damper 26 and head 11, illustrated in FIG. 1, through passage 136. Piston 138 can slide in resonance chamber 118 and can be held in the desire position by set screw 140. Resonance chamber 118 can slide to any desired longitudinal position within housing 116 and can be held in position by set screw 142. Resonance chamber 118 is closed at the end with a plug 144. Micro-packets 130 are generated by and expelled from resonance chamber 118. Micro-explosions 131 of micro-packets 130 generate pressure and acoustic waves 146. Waves 146 collide with housing 118 and propagate through the air, fuel, and water mixture 148 flowing through nozzle 117 inducing a wave which is reflected by the flat bottom of resonance chamber 118 and will generate stationary wave 150 to resonate the mass of the resonance chamber 118. Space 152 is created around resonance chamber 118 to avoid a direct wave transfer from micro-explosions 131.

Referring to FIGS. 1 and 2, in operation air and gaseous fuels flow through port 29 as liquid water or water steam flow through port 24 and pass into nozzle 17 and into resonance chamber 18 formed by piston 19. Micro-packets 30 of air-fuel-water mixture are generated or formed. The air-fuel-water mixture forming micro-packets 30 are ignited by sparkplug 20 to generate micro-explosions 31. The micro-explosions 31 will transfer thermal and acoustic energy to the mass of water contained within the micro-packets 30 partially dissociating the water and transport mass as heat and acoustic energy into central resonance chamber 13 where stationary waves are generated. When the waves generated by micro-explosion 31 interfere with the central resonance chamber 13 the waves are divided in two components.

The main component propagates through the mass 32 in the central resonance chamber 13 where incident waves or incoming waves generated by the micro-explosions 31 will interfere with the wave reflected by the flat bottom of the central resonance chamber 13, generating or forming stationary waves. The difference in phase between incident and reflected waves are near zero or zero, that is the waves are in phase and by interference produce an amplitude equal to the sum of the individual amplitudes of the two waves, reflected and incident wave, which interfere.

As a result, the mass, including combustion gases and water, in the central resonance chamber 13 are resonated and molecules are dissociated into their components. A molecular formation takes place with release of energy in resonance chamber 13, during the expelling phase, and as a result the mass 32 in the resonance chamber 13 increase its thermal and acoustic energy as pressure, and will be expelled from chamber 13 and transfers energy to the mass in the reactor. When mass 32 is expelled from resonance chamber 13 a temperature gradient forms resulting in the generation of thermal oscillations that have a high acoustic level. The reacted, byproduct, or combustion gases are exhausted through port 25 and a small volume of the combustion gases are compressed at the bottom of combustion chamber 12 and then exhausted through port 25. This will create a quick thermal expansion which has the effect of cooling the bottom of chamber 12. The exhaust or smaller diameter extension 15 will exhaust or remove the waves with frequencies other than resonance frequencies of mass 32 which are filtered out by resonance chamber 13. Acoustic damper chamber 26 works as an acoustic shock absorber which absorbs heat and acoustic energy and releases the energy when needed or desired. Infrared reflecting jacket 22 is wrapped around the water coil 21 to block infrared radiation and reflect the infrared radiation back to water coil 21. The thermo-acoustic reactor with molecular disassociation 10 is encapsulated in a thermal insulating vacuum chamber 33. A vacuum is created within vacuum chamber 33 through vacuum valve 35.

A prototype was made. The prototype, weighing only about 5 kg, ran continuously for more than 300 hours on liquid propane gas (LPG) and water consuming approximately 2.2 kg per hour of air, 62-125 grams per hour of liquid propane gas and 400 grams per hour of water. This shows an increase in thermal energy in addition to the liquid propane gas heat of combustion of approximately 2,021 kJ per mole. There were no detectable carbon emissions, carbon or carbon oxides. In test conducted with the assistance of an independent lab the invention ran at approximately 2,000° F. and the temperature at the exhaust was approximately 1,700° F. Gas chromatography showed approximately 1% carbon dioxide in the exhaust and the balance was air. In another test gas chromatography showed 0.6% methane in the exhaust and the balance was air. In another test by another independent lab the prototype consumed approximately 2.2 kg per hour of air, 65 grams per hour of liquid propane gas and 402 grams per hour of water. The temperature at the exhaust port was between 1,698° F. and 1,708° F. Test indicated only 138 parts per million (ppm) of carbon monoxide and 607.5 ppm of carbon dioxide. Test of the water vapor condensation from the exhaust showed a less than 0.1% of absorbed carbon dioxide. There was no carbon deposited on the interior surfaces of the prototype or the exhaust port. No solid particular matter was able to be collected through a filter on the exhaust port.

The present invention uses a resonance chamber to generate micro-packets of fuel that are exploded with the resulting energy directed to a central resonance chamber having a flat bottom creating standing waves resulting in a resonance of the mass in the central resonance chamber aiding in the disassociation of molecules, including water molecules being broken up into hydrogen and oxygen. The disassociation of molecules results in a very efficient reaction or combustion with virtually no carbon emissions. Accordingly, the present invention may be utilized in many conventional devices, such as a steam engine or turbine, to produce useful work from the heat generated. This work can be performed with very few harmful emissions. The present invention may also be used in heating systems in buildings or to produce hot water.

While the present invention has been described with respect to several different embodiments, it will be obvious that various modifications may be made without departing from the spirit and scope of this invention.

What is claimed is:

1. A thermo-acoustic reactor with molecular disassociation comprising:

a micro-packet and stationary wave generator coupled having a nozzle providing an air, fuel, and water vapor and a resonance chamber;

a passage formed in said micro-packet and stationary wave generator between the nozzle and the resonance chamber;

a spark plug adjacent said passage; a combustion chamber adjacent said spark plug; and a central resonance chamber placed within said combustion chamber having a bottom; and an extension coupled to said central resonance chamber having a lateral dimension less than a lateral dimension of said central resonance chamber, whereby said nozzle introduces a fuel into said micro-packet and stationary wave generator forming micro-packets and micro-explosions in the combustion chamber forming pressure and acoustic waves aiding in molecular disassociation.

2. A thermo-acoustic reactor with molecular disassociation as in claim 1 further comprising:

a piston placed within the resonance chamber of said micro-packet and stationary wave generator.

3. A thermo-acoustic reactor with molecular disassociation as in claim 1 further comprising:

an acoustic damper chamber coupled to said micro-packet and stationary wave generator.

4. A thermo-acoustic reactor with molecular disassociation as in claim 1 further comprising:

a water coil placed around said combustion chamber; and an exhaust port coupled to said combustion chamber, wherein thermal energy may be extracted to do work.

5. A method of generating thermo-acoustic energy with molecular dissociation comprising the steps of:

injecting an air, fuel, and water mixture into a resonance chamber;

expelling micro-packets of the air, fuel, and water mixture from the resonance chamber;

exploding the micro-packets of air, fuel, and water mixture generating heat and acoustic energy; and receiving the heat and acoustic energy at a central resonance chamber wherein standing waves are formed, whereby wave interference dissociate molecules into their components, including hydrogen and oxygen, in the central resonance chamber.

6. A thermo-acoustic reactor with molecular disassociation comprising:

a nozzle providing air-fuel and water vapor;

a micro-packet and stationary wave generator coupled to said nozzle;

wherein said micro-packet and stationary wave generator generates air-fuel and water vapor micro-packet;

wherein said micro-packet and stationary wave generator comprises a housing receiving acoustic waves from micro-explosions;

wherein said micro-packet and stationary waves generator comprises a resonance chamber generating stationary waves;

wherein said micro-packet and stationary wave generator and the resonance chamber are heated by heat transfer from the micro-explosions of the micro-packet of air-fuel-water mixture;

a combustion chamber having a bottom;

a spark plug;

wherein the air-fuel and water vapor micro-packet is ignited by said sparkplug to generate the micro-explosion and therefor acoustic waves in the combustion chamber;

a central resonance chamber placed in said combustion chamber and attached at the nodal point to the bottom of said combustion chamber;

wherein said central resonance chamber generates stationary waves and water molecules and combustion molecules are resonated and dissociated and then formed with a gain of energy;

wherein said central resonance chamber has a gradient temperature and thermal oscillations are generated;

a smaller diameter extension attached to one end of said central resonance chamber to balance the resonance chamber and to exhaust waves filtered by said central resonance chamber;

a water coil wrapped around said combustion chamber, whereby water is vaporized;

a water port coupled to said nozzle and attached to said water coil;

an infrared jacket wrapped around said water coil, whereby infrared radiation is blocked;

a vacuum chamber placed around the thermo-acoustic molecular disassociator, whereby the transfer of acoustic and thermal energy is blocked; and an exhaust port placed at a distance from the bottom of said combustion chamber.

7. A thermo-acoustic reactor with molecular disassociation as in claim 6 further comprising:

a condenser coupled to said exhaust port, whereby water may be condensed and recirculated.

8. A thermo-acoustic reactor with molecular disassociation as in claim 7 further comprising:

a filter coupled to said condenser, whereby particulate matter may be retained.

9. A method of generating thermo-acoustic energy with molecular dissociation comprising the steps of:

generating micro-packets of air-fuel-water mixture;

generating a stationary wave in a resonance chamber of a micro-packets and stationary wave generator;

expelling the micro-packets form the resonance chamber;

inducing a vibration in the micro-packets expelled from the resonance chamber;

exploding the micro-packets of air-fuel-water to generate heat and acoustic energies;

wherein water molecules contained in the air-fuel-water mixture are partially dissociated during the step of exploding the micro-packets; and generating stationary waves in a central resonance chamber to resonate and dissociates water and combustion product molecules, forming the disassociated water molecules with a gain of energy;

reforming the disassociated combustion product molecules into different molecules;

whereby thermal energy is created without carbon emissions.

* * * * *